(No Model.)
M. M. MURPHEY.
Stock Car.
No. 237,692. Patented Feb. 15, 1881.
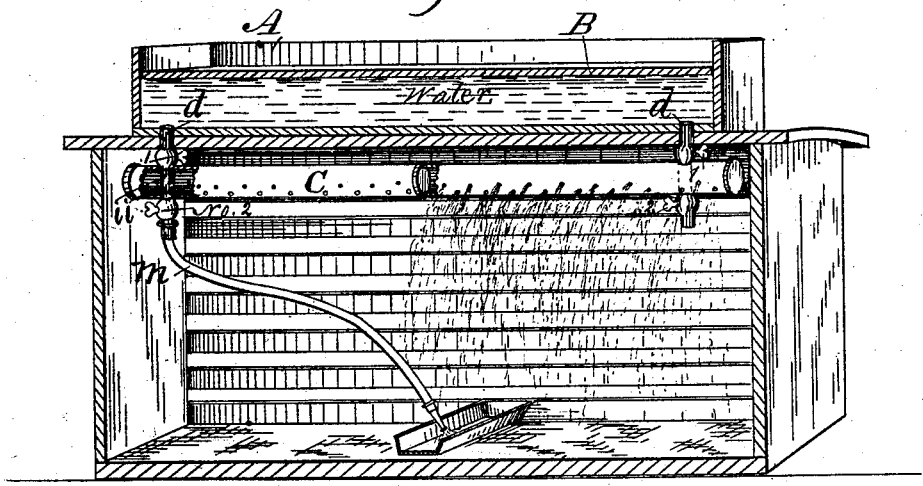
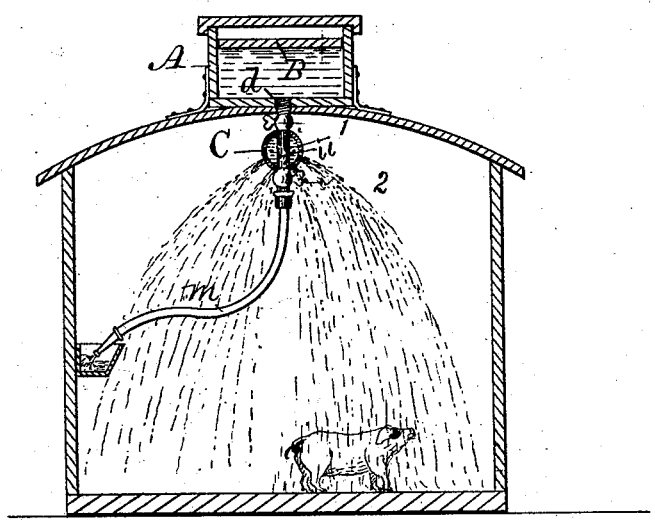
Witnesses:
P. C. Kenyon,
Frank W. Heers.
Inventor:
Miles M. Murphy,
By Thomas G. Orwig,
attorney.

UNITED STATES PATENT OFFICE.

MILES M. MURPHEY, OF DES MOINES, IOWA.

STOCK-CAR.

SPECIFICATION forming part of Letters Patent No. 237,692, dated February 15, 1881.

Application filed July 9, 1880. (No model.)

*To all whom it may concern:*

Be it known that I, MILES M. MURPHEY, of Des Moines, in the county of Polk and State of Iowa, have invented an Improved Stock-Car, of which the following is a specification.

The object of my invention is to prevent the great loss occasioned by hogs dying in cars while in transit. It frequently occurs, during the warm seasons, that cars arrive in Chicago and other places freighted with hogs, and that a dozen or more of them are found dead, having died on the way for want of water and pure air. The crowding of hogs together in a car causes the great animal heat and filth incident thereto to vitiate the atmosphere and to sicken and kill the animals if so confined too long.

My invention contemplates providing a means to control water carried on a car in such a manner that the hogs can be readily supplied with water in troughs or wet by showering it upon them, the filth washed away, and the air kept moist and cool and comparatively pure.

It consists in arranging and combining on a car a reservoir, a distributing-tube, fixed conveying-tubes, valves, and adjustable hose, as hereinafter fully set forth.

Figure 1 of my accompanying drawings is a longitudinal half-section of my improved car, showing water falling in a shower at one end only. Fig. 2 is a cross-section of the same car. Together they clearly illustrate the construction, operation, and utility of my complete invention.

A represents a long and low reservoir fixed on the top, and preferably in the longitudinal center, of a stock-car. It may be made of wood or sheet metal, and vary in size, as desired. It is provided with a hinged cover or suitable opening, through which it can be readily filled with water at any water-station along the railway-track.

B represents a float in the reservoir to prevent the water from surging when the car is in motion.

C represents a perforated tube and fountain, fixed and suspended inside of the car and immediately under the car-roof, and preferably in the longitudinal center of the car. It is divided into two or more sections by means of water-tight partitions, so that each section can be operated independently.

$d\ d$ are tubes extending from the inside of the reservoir A downward and through the fountain C, to convey water into and through the fountain. They are connected with the reservoir and the fountain by means of screw-threads, or in any suitable way, to produce strong and durable water-tight joints. They have perforations $i\ i$ in that portion that is inclosed in the fountain-tube C. Each tube $d$ has a globe-valve, 1, at a point above the fountain, and a corresponding valve, 2, below the fountain, by means of which the flow of water from the reservoir is regulated. Each tube $d$ is also provided with a screw-thread at its lower end or other suitable means for connecting a flexible hose, $m$, at pleasure, to convey water therefrom to any part of the car desired. In lieu of the two valves in each tube $d$ a two-way cock may be used to accomplish the results contemplated.

In the practical operation of my invention, when one of my improved stock-cars is loaded with hogs and the reservoir supplied with water, and the animals become heated and the air impure, I can readily, by simply closing the lower valve and opening the upper, allow the water to flow from the reservoir into the fountain to be pressed through the perforations and showered upon the animals to cleanse and cool them, and to purify and cool the vitiated atmosphere in the car or prevent it from becoming vitiated, and by attaching a hose to the lower end of one of the tubes $d$, and then opening both the upper and lower valves, I can readily convey water direct from the reservoir to fixed or portable troughs in any part of the car, or to any particular hog that may be sick and require an extra quantity of water and special attention.

I claim as my invention—

The reservoir A, the fountain C, the connecting-tubes $d$, having perforations $i\ i$, and valves 1 and 2, arranged and combined in a stock-car, substantially as shown and described, to operate in the manner and for the purposes specified.

MILES M. MURPHEY.

Witnesses:
FRANK W. HEERS,
R. G. ORWIG.